United States Patent [19]
Petrovick

[11] 3,732,631
[45] May 15, 1973

[54] FLUIDIC HEART SOUND SYNTHESIZING TECHNIQUES AND APPARATUS

[75] Inventor: Mathew L. Petrovick, Cedar Hill, N.C.

[73] Assignee: The United States of America as represented by the Secretary, Department of Health, Education, and Welfare, Washington, D.C.

[22] Filed: Sept. 16, 1971

[21] Appl. No.: 181,004

[52] U.S. Cl. ................................................. 35/17
[51] Int. Cl. ............................................ G09b 23/28
[58] Field of Search ....................... 35/17; 137/81.5; 235/200 PF

[56] References Cited

UNITED STATES PATENTS

| 3,285,264 | 11/1966 | Boothe | 137/81.5 |
| 3,334,641 | 8/1967 | Bjornsen | 137/81.5 |
| 3,376,660 | 4/1968 | McGinnis | 35/17 |
| 3,384,981 | 5/1968 | Baessler | 35/17 |
| 3,399,467 | 9/1968 | Ravin | 35/17 |

Primary Examiner—Harland S. Skogquist
Attorney—Holman & Stern

[57] ABSTRACT

A novel method and apparatus for synthesizing the sound of a heart is disclosed. In the preferred structural embodiment, fluidic principles are employed and a fluidic system is constructed so as to include an oscillator, a controllable amplifier or wave shaping device, and a filling capacitance sound chamber or bladder, all interconnected one to the other by means of flexible and pliable tubing and impedance elements. Audible noise is generated in the system by periodically filling and discharging the sound chamber. Normal and clinical syndrome heart sounds can be synthesized from the audible noise by selectively varying switching of the Coanda air bubble within the fluidic amplifier, the flow rate, volume, and wave shape of the air or other fluid filling into and discharging from the chamber in a predetermined manner by means of adjusting system parameters. The sounds so produced can be monitored and utilized in medical training programs relating to cardiovascular sound diagnosis.

13 Claims, 3 Drawing Figures

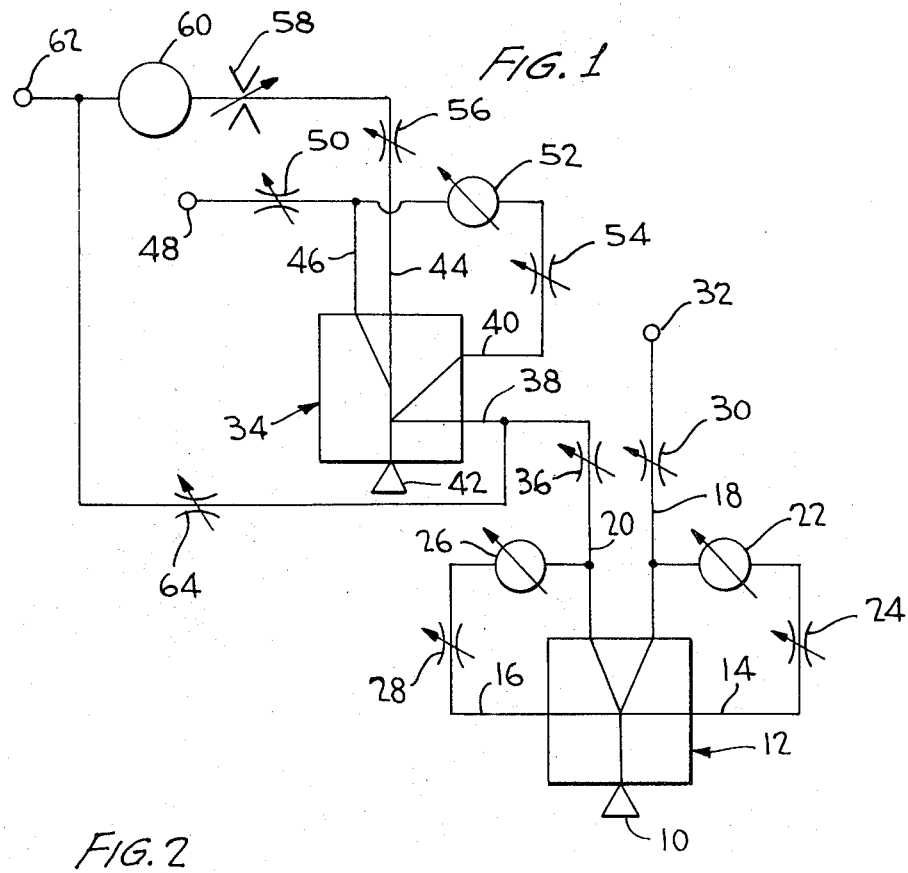
FIG. 1
FIG. 2
FIG. 3
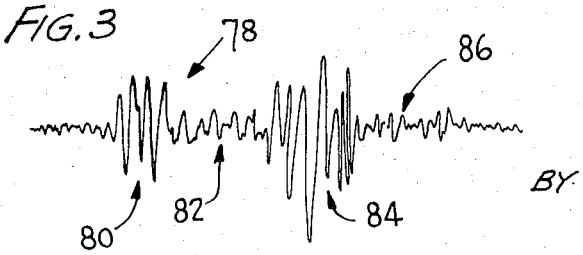
INVENTOR,
MATHEW L. PETROVICK
BY Holman & Stern
ATTORNEYS

FLUIDIC HEART SOUND SYNTHESIZING TECHNIQUES AND APPARATUS

This invention generally relates to the medical arts and particularly concerns novel techniques and apparatus for synthesizing normal and clinical syndrome heart sounds, primarily for utilization as a teaching aid and for study of cardiovascular hemodynamics.

The advantages of a system or technique by which normal and clinical syndrome heart sounds can be synthesized have been recognized in the medical arts since, with such a technique or system, cardiovascular research can be greatly facilitated, as can the training of new physicians in the peculiarities and physiological function of the heart. Yet, prior art approaches to provide a suitable heart sound synthesizer have not been entirely successful. These efforts usually relied upon the photographic or electronic arts in an attempt to arrive at the audible sound naturally produced by a heart. Such prior systems were expensive and complex and usually could only function, at best, to simulate rather than actually synthesize normal and clinical syndrome heart sound via hemodynamic principles.

Departing from the prior art technology, the instant invention proposes to synthesize cardiovascular sounds by generating such sounds in a near hemodynamic state as actually found in the human heart. The hemodynamic state as herein referred to deals with the science of pure fluidics as currently defined in the state of the art as opposed to the electronic or mechanical disciplines.

The instant invention has, therefore, as a primary object thereof the provision of a heart sound synthesizer which, to a large extent, functions as a component analogue of the human cardiovascular system, the instant invention serving to synthesize hemodynamic heart sound acoustics rather than electronic sounds. The system performance is based upon that of fluid amplifiers, which, by definition, utilize air, gas, fluid and/or mixtures of fluids and gases. A reservoir of fluid or gas serves to power the novel system without any need for electrical or electronic power as such, and the system by its very nature has no moving parts and therefore nothing to wear out, burn up, or explode. The instant inventive system is contemplated to withstand high temperatures and is subject to a minimum of maintenance, these features being primary advantages over the prior art.

An object of the instant invention concerns the provision of a heart sound synthesizer which lends itself to a means of studying the generation of heart sounds, valve closure sound relationships, hemodynamic variability such as mitral valve snap via the Coanda effect, pressure, flow, and volume and their relationships to heart sounds. As an acoustic/pressure generator, the instant inventive device can be a useful tool in biomedical engineering research of closed loop hemodynamic system analysis.

Yet another object of the instant invention contemplates the provision of a hemodynamic sound generator which can be utilized as a means of testing heart sound analyzers, heart sound instrumentation, and as a design aid in heart sound system development and calibration.

Still another contemplated object of the instant invention concerns the provision of a system which is programmable and in which one may select the type of heart sound that is to be simulated, such as aortic insufficiency, arterial septal defect, mitral insufficiency, ventricular septal defect, normal heart sounds and other biological sounds of interest.

These objects, as well as others which will become apparent as the description proceeds, are implemented by the instant invention which provides novel techniques and apparatus for synthesizing the sound of a heart. From an operational point of view, the novel inventive system function is based on the utilization of fluidic elements, both active and passive, and the routing of Coanda switching sounds, pressures, flow rates, gases or fluids into specific feedback loops within the system. The flow of air or fluid within the system, its pressure, wave shape and the like, serve to generate certain acoustic sounds which can be monitored and recorded.

The fluidic system of the instant invention is similar in operation to that of the human cardiovascular system wherein the fluid pressure, or more specifically, the blood pressure developed in the circulation process serves to create a variety of fluid flows and acoustical valve action which have their own unique sound characteristics. In a cardiovascular system, a valving process takes place such as the aortic or mitral valve closures. The pressure related acoustics of the fluid, the opening and closing of the heart valves also contributes to generation of cardiovascular sounds along with some flow turbulence, though most flow in the cardiovascular system is laminar or pulsatile. These flow characteristics of the cardiovascular system can likewise be simulated or an analogue thereof created in the pure fluidic system of the instant invention. By altering the various characteristics such as pressure gradient within the splitter region of the fluidic amplifier, the Coanda bubble, the R-C time constant, the impedance, oscillation rate, and the like of the fluidic system of the instant invention in a preselected manner, most human heart sounds, either normal or clinical syndrome, can effectively be duplicated, provided proper instrumentation techniques are used.

In the preferred inventive embodiment, it will be seen that a pure fluidic system is provided of the type which includes a fluid oscillator means, a controllable or wave shaping amplifier means, and a capacitance sound chamber or bladder all interconnected one to the other by means of flexible and resilient tubes. Audible noise is generated in the system by periodically filling and discharging the capacitance sound chamber through operation of the fluidic oscillator and controllable amplifier. This audible noise or sound is made to actually synthesize normal and clinical syndrome heart sounds by selectively varying the orifice size, flow rate, volume, pressure and wave shape of the fluid filling and discharging from the capacitance chamber in a predetermined manner. Control over the pressure, flow rate, volume and wave shape of the fluid amplifier can readily be effected through discrete and largely empirically derived changes in the fluidic impedance, capacitance, Coanda bubble entrainment, and other characteristics of the fluidic system. The synthesized sounds so produced are then monitored, through the utilization of a standard microphone and recorder, for example, the monitoring preferably taking place on the surface of the capacitance chamber itself.

The preferred structural embodiment of the instant invention is such that the various sounds so synthesized may be readily programmable by the system operator and, in this respect, the system of the instant invention contemplates the utilization of a program card containing fluidic restrictions such as orifices resulting in various impedances inserted into the fluidic sound processing chamber. Each of the different orifice restrictions of the program card is designed to synthesize different cardiovascular sounds and changing of the program card thus serves to modify performance of the type of heart sounds produced and the behavior of the overall system.

In actual tests, when conventional clinical heart sound and engineering measuring instruments were utilized to monitor system performance, the fluidic heart sounds produced by the instant inventive system provided very nearly identical results as such heart sound measuring instruments provide when connected to humans. Such observations suggest that the performance of the instant invention very nearly approaches a true hemodynamic performance of the cardiovascular system as determined by auscultation techniques and analogue cardiovascular pressure records corresponding to human characteristics such as aortic and ventricular pressures, dicrotic notch, first and second heart sounds as recorded in humans and animals. The invention, then, in addition to functioning as a means of teaching the biomedical engineering and hemodynamic aspects of the cardiovascular system to medical students and cardiovascular physiologists, further functions as a means to synthesize an accurate spectrum of human heart sounds representing a population of clinical disease states for the purpose of evaluating existing heart sound computer instrumentation and the like.

The invention itself will be better understood and further advantageous features thereof will become evident from the following detailed description of a preferred inventive embodiment, this description making reference to the appended sheet of drawings wherein:

FIG. 1 is a schematic illustration of the fluidic circuitry defining the preferred system of the instant invention designed to synthesize heart sounds;

FIG. 2 is a diagrammatic and perspective illustration of selected elements of the fluidic circuitry of FIG. 1, and particularly of the programmable fluidic impedance elements by which various heart sounds are selected, and of the capacitance element at which point audible monitoring is desirably effected; and FIG. 3 is a diagram depicting a typical audible wave form generated by the novel inventive system.

Referring now to FIG. 1, a fluidic schematic diagram of a preferred embodiment of the novel inventive system is disclosed. As above-stated, the novel system is of the "pure" fluidic type requiring no external electrical power, and incorporating virtually no moving parts. The fluidic power source provided may take the form of gas, air, oxygen, or a gas mixture presenting variable acoustic properties and variable transmission velocities. Alternatively, and in accordance with the invention, the fluidic medium could comprise a liquid such as pure milk, artificial milk, hydraulic fluid, oil, blood, water, saline, reagents, or combinations of biological fluids or any fluid combination of acoustic transmission variability.

The fluidic supply is coupled to an input 10 of a fluidic oscillator generally designated 12. The fluidic oscillator 12 is an active flueric component and, in the preferred inventive embodiment, is contemplated to comprise a fluidic flip-flop having control inputs 14 and 16, and two outputs 18 and 20, respectively. Time-delay fluidic elements are coupled in a feedback loop between the outputs 18 and 20 and the respective inputs 14 and 16 of the fluidic flip-flop 12. The time-delay elements may comprise, for example, a variable fluidic capacitance 22 and a variable fluidic resistance 24 coupled between terminals 18 and 14, as well as a variable fluidic capacitance 26 and a variable fluidic resistance 28 coupled between terminals 20 and 16.

The fluidic flip-flop 12 operates in accordance with known principles in that the fluid power stream applied to input 10 attaches by means of the Coanda effect to one or the other of the internal walls of the interaction chamber within the flip-flop 12, this attachment directing the fluid stream past an internal splitter and subsequently into one or the other of the two outputs 18 and 20. Assuming, for example, that the fluid stream in the internal interaction chamber of the flip-flop 12 is attached to a right hand side wall of the device, then the fluid stream would empty into the flip-flop receiver line leading to the output channel 18. The fluidic resistance capacitance feedback elements 22 and 24 coupled between the output 18 and the control input 14 of the fluidic flip-flop 12 would then present a controllable time-delay in known fashion until the pressure applied at the control input 14 is sufficient to switch the main fluidic stream to the other output 20 of the fluidic flip-flop amplifier, and the process would repeat. By suitably controlling the routing of pressures, flow rates, and the like through the feedback loops by means of varying the values of the discrete time-delay components, the particular system oscillation or rate can be varied at will. Since the instant inventive system is designed to synthesize the sound of a heart, selection of system parameters should be such that the oscillation or pulse rate range is variable from approximately 60 to 125 oscillations per minute.

One output 18 of the fluidic flip-flop 12 passes through a controllable variable fluidic resistance 30 to a vent 32 while the other output 20 of the fluidic flip-flop 12 connects to a further staged active fluidic element 34 via a coupling variable fluidic impedance 36. Accordingly, a controllable series of fluidic pulses appear on output line 20 and form one of the control inputs 38 to the fluidic element 34.

Fluidic element 34 essentially comprises a controllable wave shaping fluidic amplifier means such as a fluidic NOR/OR element having two control inputs 38 and 40. The fluidic element 34 further has a supply input 42 coupled to the main fluidic supply as is input 10 of fluidic element 12. Two outputs 44 and 46 are provided, output 46 leading to a vent 48 via a variable fluidic resistance or impedance 50, as well as to control 40 via a feedback loop comprising time-delay variable capacitance element 52 and variable resistance or impedance element 54.

In known fashion, an output would appear on line 44 of the fluidic logic element 34 when no input pressure appears at input control lines 38 and 40 (the fluidic element 34 thus comprising a NOR logic element) or, as desired, only when input pressure appears at one or the other of the two control lines 38 and 40 (fluidic amplifier 34 thus comprising a logic OR element). The particular timing, duration, and wave shape of the output appearing at line 44 of fluidic element 34 can be controlled as a function of the time-delay effected by impedance elements 52 and 54, load 50 on output 46, and the time spacing and duration of input pulses occuring at control input line 38. Thus, the routing, timing and duration of pulsing pressures appearing at output line 44 of the system as thus far described is variable and can be controlled by modifying in a selective fashion various orifices described. As will further be apparent to those skilled in the fluidic arts, modification of the internal structure of the various fluidic elements further can effect changes in oscillation rates, pressure volume, and the like.

The pulsed output on line 44 from fluidic element 34 is then passed through a further adjustable resistance or impedance element 56 and through a novel variable non-linear orifice element 58 as will be discussed hereinbelow, to a capacitance or filling chamber or bladder 60, which chamber is also of novel design and will be discussed in more detail. Chamber 60 is vented to a resistance 62 and further is preferably coupled in a feedback loop via variable resistance 64 to a control input 38 of the fluidic wave shaping amplifier 34.

During operation of the system and in response to the oscillation rate of flip-flop 12 and the wave shaping and timing operation of element 34, the capacitance chamber 60 becomes filled through the variable impedance 58 and, when filled, serves to switch off the fluidic amplifier 34 via the feedback loop incorporating the adjustable impedance 64. The fluidic pressure within chamber 60 then bleeds down to a low volume via the vent 62. Moments later, in accordance with the adjustable system timing, the chamber or reservoir 60 is again filled and the cycle continuously repeats itself.

Chamber 60 is, as above-stated, a fluidic capacitance element and physically may take a variety of forms such as a fixed volume cylindrical chamber, or a resilient and variable volume reservoir such as a blood pressure cuff. Chamber 60 functions in this novel system as a fluidic analogue to either the right or left ventricle of the heart and the chamber or bladder 60 is the preferred source for monitoring various heart sounds as the chamber is going through the above-described fill and emptying process, much in the same manner as the human heart.

In addition, and in the preferred inventive embodiment, a further analogue to a cardiovascular system is introduced in that each of the interconnecting lines between the various fluidic elements is contemplated to comprise fluidic tubing which is soft and pliable. Such tubing as is attached to the chamber 60, for example, comprises an analogue to the pulmonary artery, or the aortic transmission lines of the heart and it has been found that acoustic sounds generated in the novel system travel along the tubing with the capacitance 60 acting as an effective sound chamber. Through the utilization of soft pliable interconnecting tubing between the elements and particularly as connected to the chamber 60, it has been found that one can generate the hemodynamic effect of vasoconstriction and vasodilation and cause wave form changes in the fluid and thus create acoustic variability. The acoustics of the filling chamber 60 itself will therefore vary as a function of pressure, flow and volume and if the novel system switches over from one switching mode to another at various states of chamber pressure and volume, the acoustic sounds thereby generated within the chamber will also vary.

The novel invention is capable of controllably generating normal and organic clinical syndrome heart sounds simply by changing the output load impedance of the active fluidic elements, the orifice size and shape, the feedback impedance, and the time constants of the various fluidic components in a selected and largely empirically derived manner. The changing of various impedances and feedback time-delays and the like within the system can be considered as being analogous to changing the arteriolar-capillary bed resistance or cardiovascular loading and such changes therefore alter the basic sounds created within chamber 60. These basic sounds, as described, can be monitored at the chamber 60 through the utilization of a simple microphone such as indicated by reference numeral 64 in FIG. 2, the output of the microphone then passing through a conventional heart sound filter amplifier 66 and to a recorder-monitor device 68 if desired.

With the general system as above-described and under specially controlled feedback or venting impedances, the novel system is capable of generating only sounds from low pressures or analagous quiet valve closures. Under different and varied combinations of system feedback, the audible sounds generated can be made to include the "slap" of the fluidic valves, or Coanda bubbles via pressure gradient control thus providing a further clinical analogy to the cardiovascular system.

The basic system can be further expanded as will be obvious to those of ordinary skill in the art merely through the addition of further summing amplifiers or through the provision of discrete summing junctions in the various fluidic feedback loops. The filling or capacitance chamber 60 can be constructed so as to have multiple inputs with a number of different fluidic amplifiers and logic elements driving the chamber so as to thereby generate a broad spectrum of acoustic sounds, the chamber 60 operating much in the same manner as a fluidic turbulence amplifier so as to generate both laminar and/or turbulent flow. Further, if desired, the audible sounds so produced by the system can be monitored not only at the chamber 60, but as such sounds travel along the various fluidic transmission and interconnection lines in an analagous manner to monitoring the Kortokoff sounds in the bracheal artery blood pressure.

Referring specifically now to FIG. 2 of the drawings, the preferred physical construction of the variable orifice impedance element 58 is depicted, as is a schematic illustration of the filling chamber 60 and monitoring apparatus as above-discussed. In the preferred inventive embodiment, chamber 60 is constructed of an elastic material and the connections both to and from the chamber 60 are made by flexible tubing as generally designated by numeral 70. The variable impedance element 58 disposed in the input line to chamber 60 preferably is constructed as a selectively moveable card or sheet 72 incorporating a number of different size and shape orifices or restrictions 74 and 76, for example. The card or sheet 72 is insertable in the input line to the chamber 60 and by selectively moving the card, various ones of the differently constructed orifices can by placed in the fluidic line to present a discrete fluidic impedance. The card 72 may be constructed from plastic and the various size, shapes, and profiles of the restrictions or orifices 74 and 76, for example, drilled therethrough with each orifice or hole in the card representing a specific class or type of heart sound desired. Accordingly, for any specific type of heart sound desired, a different hole or orifice would be aligned in the fluidic input tubing to chamber 60. Coupled with discrete movement of the "programming" card 72, interconnections may be made to various other ones of the adjustable impedances within the system so that, if desired, completely automatic and repeatable control of the audible sounds generated can be obtained.

A typical though schematic wave form of audible sounds produced by the novel inventive system is depicted in FIG. 3 of the drawings, the wave form generally being indicated by reference number 78. Similar to the wave form produced by a human heart, for example, a first CVS is produced as at reference numeral 80 followed by a systolic rumble with a second CVS being produced as at 84 followed by a diastolic rumble 86. Such a wave form though, is only exemplary of the audible sounds capable of production by the instant system. It has been found, for example, that normal heart sounds are relatively easy to synthesize while various grades of heart sounds such as aortic insufficiency, septal defects, diastolic rumble and the like require careful adjustment of the various orifices to obtain. Likewise, the system is capable of generating a systolic murmur, splitting of the second heart sound, and an early diastolic murmur by suitable and empirical adjustment of the impedances.

During construction of the system, and in the preferred inventive embodiment, the acoustic properties of the system can greatly be enhanced by coating various portions of the fluidic transmission lines, the fluidic splitter region of the various fluidic amplifiers, the control and exit ports and the like of the discrete components with a means serving to reduce static potential build-up within the internal system. In this respect, coating the internal portions with an oil and water repellant such as Zepel ™ by DuPont, a fluorocarbon which is a fabric fluoridizer, is preferred though other coating materials have likewise been found to function as a means of enhancing acoustic properties and of reducing static potential within the system. Such other materials comprise plastic, vinyl, polyvinyl, polystyrene, glass, glycerin, glycerin base, silicone, silicone derivitive, or derivitives of Zepel™.

In virtually any system of the type described, static charge potentials are created within the inner walls of the fluid amplifiers and the other elements due to the Coanda effect and the various jet streams, eddies and vortices of fluid flow. These potentials can be substantially eliminated or reduced, as above-described, through the utilization of the enumerated coatings. Similarly, with artificial element transplants within the body, similar static charge potential build-up is found and is defined as "electret phenomena," this static charge potential build-up occuring in several regions of an artificial heart implant, for example, and having the adverse effect of decomposing the blood causing hemolysis, forming clots, and causing damage to the neointama. The instant inventive utilization of a coating such as Zepel ™, for example, has applicability to not only an external fluidic sound synthesizing system, as described, but also to a fluidic system of the type to be implanted within the body so as to reduce static potentials, hemolysis and blood clotting.

Throughout the above description of the preferred embodiment certain enumerated components such as fluidic flip-flop 12, fluid NOR/OR logic amplifier 34 and the like were discussed. Yet, the operational principles of the invention are not so limited to the specific incorporation of these fluidic components. As will be appreciated by those skilled in the art, the fluidic flip-flop 12 could be replaced by a functional fluidic oscillator or a pulse generator of different physical construction, and the wave shaping logic element 34 could, for example, take the form of a turbulence amplifier, a vortex amplifier, a fluidic NAND/AND gate, a monostable or triggering element, or the like. The capacitance chamber 60, for example, could further take different structural forms than that specifically illustrated in FIG. 2 consistent with the principles taught by the instant invention. Furthermore, monolithic and planar integrated fluidic circuits could be incorporated into the system to take the place of the discrete fluidic elements specifically disclosed.

It should now be apparent that the objects initially set forth at the outset of this specification have been successfully achieved. Accordingly,

What is claimed is:

1. A method of synthesizing the sound of a human heart utilizing pure fluidic system components including an oscillator, a controllable amplifier, and a filling capacitance sound chamber interconnected one to the other, said method comprising the steps of:
   generating audible noise by periodically filling and discharging the chamber;
   synthesizing normal and critical syndrome heart sounds from the audible noise by selectively varying the Coanda pressure gradient/bubble, flow rate, volume, and wave shape of the fluid filling and discharging from the sound chamber in a predetermined manner; and
   monitoring the heart sounds so produced at the sound chamber.

2. A method as defined in claim 1, including the step of utilizing a fluid selected from the group consisting of milk, hydraulic fluid, oil, blood, water, saline, reagents, and combinations of biological fluids.

3. A method as defined in claim 1, further including the step of utilizing a fluid selected from the group consisting of gas, air, oxygen, and combinations thereof.

4. A method as defined in claim 1, further including the step of coating inner surfaces of selected elements within the fluidic system with an oil and water repellant compound so as to reduce static potential and enhance acoustic properties.

5. A method as defined in claim 4, wherein the coating comprises Zepel.

6. An apparatus for synthesizing the sound of a heart, said apparatus defining a fluidic system comprising:
   a fluid oscillator means having a controllable rate;
   a controllable wave shaping fluidic amplifier means coupled to said fluid oscillator means;
   a fluidic capacitance sound chamber means;
   variable impedance means including orifice means coupled between said amplifier means and said chamber means; and
   monitoring means for monitoring audible sound generated in said chamber, the audible sound varying in accordance with the Coanda effect, fluid flow rate, volume, wave shape and orifice profile within said fluidic system.

7. An apparatus as defined in claim 6, wherein said orifice means of said variable impedance means comprises a plurality of orifices and restrictions of different shape and size selectively insertable into a fluid feed line coupled between said amplifier means and said chamber means.

8. An apparatus as defined in claim 6, further including a feedback fluid line coupled between said chamber means and said amplifier means so as to allow said chamber means to discharge, said feedback fluid line controlling operation of said amplifier means.

9. An apparatus as defined in claim 8, wherein said chamber means is elastic.

10. An apparatus as defined in claim 7, wherein fluidic lines couple said elements of the fluidic system together, said fluidic lines being constructed of resilient and flexible material to thereby simulate the hemodynamic effect of vaso-constriction and vasodilation, cause wave form changes in the fluid, and to create acoustic variability.

11. An apparatus as defined in claim 10, wherein said fluidic oscillator means comprises a fluidic flip-flop whose rate of oscillation is controlled by fluidic resistance-capacitance feedback loops.

12. An apparatus as defined in claim 11, wherein said controllable wave shaping fluidic amplifier means comprises a fluidic logic element.

13. An apparatus as defined in claim 12, wherein said fluidic logic element comprises a NOR gate.

* * * * *